United States Patent [19]

Laskorin et al.

[11] Patent Number: 5,449,396
[45] Date of Patent: Sep. 12, 1995

[54] METHOD FOR RECOVERING GOLD AND SILVER FROM ORE STARTING MATERIALS

[76] Inventors: Boris N. Laskorin, Kotelnicheskaya naberezhnaya, 1/15, kv. 131; Natalja J. Gasteva, Uralskaya ulitsa, 11, kv. 172; Viktor V. Dobroskokin, Chongarsky bulvar, 11, kv. 39; Tatiana I. Konenkova, Parkovaya ulitsa, 55, korpus 3, kv. 14; Vladimir P. Volkov, Kantemirovskaya ulitsa, 7, kv. 204, all of Moscow, Russian Federation

[21] Appl. No.: 282,606

[22] Filed: Jul. 29, 1994

Related U.S. Application Data

[63] Continuation-in-part of Ser. No. 969,199, Feb. 16, 1993, abandoned.

[51] Int. Cl.$^6$ .............................................. C22B 3/42
[52] U.S. Cl. .................................. 75/735; 75/737; 423/24; 423/25
[58] Field of Search .............. 75/735, 737; 423/25, 423/24

[56] References Cited

FOREIGN PATENT DOCUMENTS 9010721 9/1990 WIPO ............................. 423/24

Primary Examiner—Melvyn Andrews
Attorney, Agent, or Firm—Lilling & Lilling

[57] ABSTRACT

A pulp with ph=9.5 to 11.5, resin, and cyanide KCN is fed to a reaction zone. KCN is in a concentration of $CN^-$ ions in the liquid phase of the pulp from about 0.1 to about 10 g/l, which is maintained constant. The sorbent is in an amount providing its concentration 1 to 1.5% of the reaction zone volume. The leaching procedure produces a sorbent with impurities and rich in gold and silver, and a cyanic pulp depleted of gold and silver. Then, the sorbent rich in gold and silver is separated from the cyanic pulp. The saturated sorbent with impurities is processed in the desorption zone in two stages by passing therethrough a sulfuric acid solution of thiourea, the volume of the solution comprising 10 to 15 volumes of said sorbent. The sulfuric acid solution of thiourea is in an amount of 30% to 50% of said solution volume. A sulfuric acid solution of thiourea rich in gold and silver and a sorbent depleted of gold, silver and impurities is obtained. The remaining amount of the sulfuric acid solution of thiourea is fed onto the sorbent depleted of gold, silver and impurities to obtain a sulfuric acid solution of thiourea depleted of gold and silver, which is supplied to the first processing stage, and a sorbent with a residual content of gold, silver and impurities.

9 Claims, 5 Drawing Sheets

METHOD FOR RECOVERING GOLD AND SILVER FROM ORE STARTING MATERIALS

This Application is a Continuation-In-Part of the U.S. patent application Ser. No. 07/969,199, filed Feb. 16, 1993, and now abandoned.

FIELD OF THE INVENTION

The invention relates to hydrometallurgy and, more specifically, to the recovery of gold and silver from ore starting materials.

BACKGROUND OF THE INVENTION

Hydrometallurgical methods hold an important place in gold-mining industry; they are applied in processing of practically all ore starting materials. Leaching of gold and silver with a cyanide-containing solution underlies the hydrometallurgical methods for processing gold- and silver-bearing ore starting materials.

To recover the gold and silver from the solution, use is made of various methods, such as precipitation, sorption, extraction and the like.

The most promising are hydrometallurgical methods using sorption processes with application of solid sorbents. The principal advantage of these methods is the possibility of effecting the recovery of dissolved valuable elements directly from cyanic pulps, which makes unnecessary expensive power-intensive operations of filtration and washing of the pulp, which, in turn, results in a considerable reduction of capital outlays and operation expenditures, owing to a reduction of working areas and materials and power savings and also in an increased recovery of gold and a silver from ore starting materials, improved quality of finished products, a decrease in the amount of unfinished products and so on.

Known in the art is a method of gold and silver recovery from ores, according to which the starting material is processed at a low density of the cyanic pulp, that is, the content of the solid phase in the pulp is not more than 10% (European Patent No. 9010721, issued in September of 1990).

The pulp after being leached with the solution containing cyanides is held for some definite time, then filtered to separate the liquid phase, containing the dissolved noble metals, from which they are separated by sorption on activated carbon or ion-exchange resin.

The main disadvantage of this method is the use of diluted pulps, which requires large-size equipment and increases the time of the process and the losses of valuable elements with a large volume of the liquid phase and also necessary separation of the solid and liquid phases of the pulp.

It is known to recover gold and silver from ore materials rials by sorption from cyanic pulps on activated, carbon (CIP method). With this method, the pulp is treated with cyanide solutions and a sorbent in the form of activated carbon is then added (L. E. Telegina, L. A. Davydova. Modern State of Sorption Processes for Recovering Gold from Ores Abroad TsNIIekonomiki i informatsii. Tsvetnaya metallurgia. Obogaschenie rud tsvetnykh metalloy. No. 2, 1983, p. 5).

According to this method, an aqueous pulp is prepared from a starting ore material and water, this pulp is alkalized by introducing soluble alkylis to create an alkalinity of about 9.5 to about 11.5 and the alkalized pulp is fed to a reaction zone whereto a cyanide soluble in the liquid phase of the pulp and then granulated activated carbon are fed. Gold, silver and impurities pass to the liquid phase of the pulp due to the reaction with the cyanide and are then absorbed by the activated carbon surfacer and the pulp becomes depleted of gold and silver. After separation of the carbon with the elements absorbed thereby from the pulp depleted of these elements, the carbon is fed to a desorption zone and the pulp is taken off the process. The carbon containing the absorbed elements is treated with a solution of hydrochloric acid to remove part of the impurities and then with an alkaline-cyanic solution for gold and silver desorption with the result of obtaining an Au- and Ag-containing solution taken off the process and carbon depleted of these elements which is fed to a reactivation zone where the carbon is treated with a water vapour at a temperature of about 1000° C. to remove the remaining impurities and to restore its porosity. After this step, the carbon is removed from the reactivation zone and is fed to said reaction zone.

This method features a low content of gold and silver on the sorbent (activated carbon), lower gold and silver concentrations in the solution obtained in the desorption zone, high sorbent losses due to attrition and the need to carry out high-temperature reactivation of sorbent before reuse.

It is also known to recover gold and silver from ore starting materials (ores, concentrates and slimes) by a method using synthetic resin as the sorbent.

This method comprises preparing an aqueous pulp in which an alkalinity is created of about 9.5 to about 11.5 by introducing thereto soluble alkalis to obtain an alkalized pulp which is delivered to a reaction zone which is fed with a cyanide soluble in the liquid phase of the pulp and with a porous grained synthetic sorbent containing anion-exchange groups. Due to the reaction with the cyanide gold, silver and impurities pass to the liquid phase of the pulp as negatively charged ions which are absorbed by the sorbent, resulting in a gold-and silver-saturated sorbent with impurities and a pulp depleted of gold and silver. After separation from the pulp depleted of gold and silver, which is taken off the process, the gold- and silver-saturated sorbent with impurities is delivered to a desorption zone. In the desorption zone, the sorbent saturated with gold and silver and with impurities is treated with a sulfuric acid solution of thiourea containing 80 to 90 g/l thioureau and 20 to 26 g/l sulfuric acid. The volume of this solution of thiourea comprises 10 volumes per the volume of the sorbent. As a result, there are obtained a sulfuric acid solution of thiourea with gold, silver and impurities, which is taken off the process, and a sorbent with a residual content of gold, silver and impurities. In the desorption zone, this sorbent is treated with a solution of sodium hydroxide with a concentration of 25 to 30 g/l as a result of which a solution of sodium hydroxide with impurities is obtained, which is taken off the process, and a purified sorbent which is delivered to a reaction zone.

This method requires a sufficiently high consumption of cyanide, which makes a considerable amount of impurities to pass to the liquid phase of the pulp. As a consiquence, to obtain a sufficiently high amount thereof on the saturated sorbent, the method fails to produce a sufficiently high content of gold and silver on the saturated sorbent, a sufficiently full separation of gold, silver and impurities in the desorption zone, or a high recovery of gold and silver from the ores containing natural sorbents.

SUMMARY OF THE INVENTION

An object of the present invention is to increase the recovery of gold and silver from ore materials.

Another object of the present invention is to ensure a more economical process and more selective with respect to valuable elements.

Still another object of the present invention is to ensure a practically full separation of the valuable elements Au, Ag from impurities and obtaining gold- and silver-concentrated solutions.

One more object of the present invention is to create the conditions for effective processing of ore materials which are difficult to leach.

With these and other objects of the present invention, the method for recovering gold and silver from a starting ore material containing gold, silver and impurities comprises the following steps.

An aqueous pulp is prepared whose solid phase is a comminuated ore material and whose liquid phase is water.

Alkali is added in said aqueous pulp to create an alkaline medium in its liquid phase with a pH of about 9.5 to about 11.5. An alkalized pulp is thus produced whose solid phase is said comminuted ore material and whose liquid phase is the aqueous alkaline solution.

Into the reaction zone of said alkalized pulp, a cyanide soluble is fed in said liquid phase of said alkalized pulp to form a cyanic pulp whose solid phase is said comminuted ore material and whose liquid phase is an alkaline-cyanic solution containing $OH^-$ and $CN^-$ ions and a porous grained cynthetic sorbent containing anion-exchange groups. The cyanide is fed in an amount ensuring the concentration of the ions $CN^-$ in said liquid phase of said cyanic pulp from about 0.1 to about 10 g/l, which is maintained constant. The sorbent is fed in an amount ensuring its concentration 1 to 1.5% of the reaction zone volume. In said reaction zone, leaching of gold, silver and impurities from the solid phase of said cyanid pulp takes place accompanied by the formation of negatively charged cyanic complexes of gold, silver and impurities which pass to the liquid phase of said cyanic pulp and are absorbed by said sorbent, resulting in a gold- and silver-saturated sorbent with impurities and a cyanic pulp depleted of gold and silver.

The gold- and silver-saturated sorbent with impurities is separated from said cyanic pulp depleted of gold and silver, which is taken off the process.

The gold- and silver-saturated sorbent is fed in a desorption zone.

The gold- and silver-saturated sorbent with impurities is treated in two stages in the desorption zone by passing therethrough a sulfuric acid solution of thiourea containing 50 to 90 g/l thiourea and 15 to 25 g/l sulfuric acid, the solution volume comprising 10 to 15 volumes of said sorbent in order to desorb gold, silver and impurities. At the first stage of said treatment, said sulfuric acid solution of thiorea is fed to said gold- and silver-saturated sorbent with impurities in an amount of 30 to 50% of said solution volume, resulting in a sulfuric acid solution of thiourea rich in gold and silver, which is taken off the process, and a sorbent depleted of gold, silver and impurities. At the second stage of said treatment, the remaining amount of said sulfuric acid solution of thiourea is fed to said sorbent depleted of gold, silver and impurities, resulting in gold-and silver-depleted sulfuric acid solution of thiourea, which is directed to the first stage of said treatment, and a sorbent with a residual content of gold, silver and impurities.

In the desorption zone, the sorbent with the residual content of gold, silver and impurities is treated with a sodium hydroxide solution of the concentration 15 to 40 g/l to obtain as a result of a reaction of sodium hydroxide with the impurities sodium hydroxide solution with the impurities, which is taken off the process, and a purified sorbent which is taken off the desorption zone and fed to said reaction zone.

With the method of the present invention, recovery of gold and silver from an ore starting material is increased, with the process being more economical and selective with respect to the valuable elements. This is provided by the required concentration of cyanide which increases the selectivity of dissolving gold and silver with the result that the consumption of cyanide is reduced because it is expended to a less degree for dissoling unnoble metals and the content of impurities in the pulp liquid phase is also decreased, which improves the conditions of absorbing gold and silver by the sorbent causing an increase in their content on the saturated sorbent and, at the same time, a decrease of the content of impurities thereon and also improvement of the conditions and indexes of the desorption. The concentration of CN ions from 0.1 to 10 g/l is defined by the type of the starting material: for common quartz ores it must close to the lower limit of this range, for ore materials which are difficult to leach the concentration may reach the upper limit. A concentration of CN ions less than 0.1 g/l fails to ensure a high recovery of gold and silver from an ore material, and a concentration higher than 10 g/l brings about an increased dissolution of impurities and substantially increases in the cyanide consumption. The sorbent concentration in the reaction zone must be 1 to 1.5% of its volume. A lower concentration thereof impairs the conditions of absorption of gold and silver by the sorbent, and its concentration higher than 1.5% will cause higher mechanical losses of the sorbent. Treatment of the saturated synthetic sorbent with a sulfuric acid solution of thiourea and then with an alkaline solution provides for the desorption of gold, silver and part of the impurities by the first of the above-mentioned solutions and practicall full desorption of the remaining impurities and restoration of the sorptive properties of the synthetic sorbent after the alkaline treatment. The total volume of each solution comprises 10 to 15 volumes of the sorbent. Treatment of the sorbent with a sulfuric acid solution of thioures in two steps with the use of 30 to 50% of the total solution volume in the first step allows to concentrate practically all gold and silver in a less volume and ensures a high total degree of desorption of all the elements. A decrease of the total volume of the desorbing solutions will result in an incomplete desorption of the elements from the saturated sorbent, and a use of the volume of the solutions more than 15 volumes of the sorbent will fail to provide a high concentration of the elements in the solution obtained. The use in the first step of treating the saturated sorbent with a sulfuric acid solution of thiourea, the volume of which is less than 30% will cause a decrease in the amount of the valuable elements taken off the process and an increase of the amount of unfinished products. The use in the same step of said solution of thiourea of a volume more than 50% will result in a reduced concentration of gold and silver in the solution produced.

It is advantageous to provide the following steps in the recovery method of the present invention.

Into the desorption zone onto the gold- and silver-saturated sorbent with impurities, an alkaline cyanic solution is fed and which contains 40 g/l sodium cyanide and 1 to 2 g/l alkali. As a result of which a gold- and silver-saturated sorbent is produced depleted of impurities, mainly of copper and iron, and a solution is produced with cyanic complexes of impurities, mainly of copper and iron, taken off the process.

Into the desorption zone, a sulfuric acid solution is delivered with a concentration 40 to 50 g/l onto said gold- and silver-saturated sorbent depleted of impurities, mainly of copper and iron, with the result that a gold- and silver-saturated sorbent is produced with a residual content of impurities, and a solution is produced containing impurities, mainly zinc and nickel, which is taken off the process.

These steps of feeding the alkaline-cyanic solution and the sulfuric acid solution are carried out prior to treating in two stages of the gold- and silver-saturated sorbent containing impurities with the sulfuric acid solution of thiourea.

Conducting in the desorption zone, prior to treating the saturated sorbent with the sulfuric acid solution of thiourea, its treatment with a solution containing sodium cyanide and alkali and then with a solution of sulfuric acid makes it possible to obtain pure solutions of gold and silver, owing to the fact that in this case selective desorption occurs of different groups of elements. When treating with the alkaline-cyanic solution, mainly copper and iron are removed from the saturated sorbent, and, when treating with the sulfuric acid, zinc and nickel are removed, and, when treating with the sulfuric acid solution of thiourea, gold and silver are removed.

In the method of the present invention, it is recommended to feed, in the desorption zone onto the gold- and silver-saturated sorbent with impurities, the solution of sulfuric acid with hydrogen peroxide, containing 40 to 50 g/l sulfuric acid and 2 to 8 g/l hydrogen peroxide, with the result that there are produced a gold- and silver-saturated sorbent depleted of impurities and a solution containing impurities, which is taken off the process.

The solution of thiourea is delivered to the desorption zone with the concentration 60–90 g/l onto said gold- and silver-saturated sorbent depleted of impurities, resulting in producing a gold-saturated sorbent depleted of silver and with a residual content of impurities and solution containing silver, which is taken off the process.

The steps of delivering the sulfuric acid solution with hydrogen peroxide and the solution of thiourea are conducted prior to treating in two steps the gold- and silver-saturated sorbent with impurities with the sulfuric acid solution of thiourea.

Treating the saturated sorbent, prior to its treatment with the sulfuric acid solution of thiourea, with a solution containing sulfuric acid and hydrogen peroxide and then with a solution of thiourea permits removing practically all impurities at the first stage of these treatment, conducting silver desorption at the stage of treating with thiourea, thereby providing separate desorption of impurities, silver and gold.

Prior to feeding said sorbent to said reaction zone, it is required to conduct in the latter zone stirring of the cyanic pulp, the time of the stirring amounts to 25 to 50% of the time of leaching gold, silver and impurities from said solid phase of said cyanic pulp.

Stirring of the pulp with the cyanide charged thereto prior to the delivery of the sorbent thereto permits increasing the gold and silver content on the sorbent, owing to an increase of the gold and silver concentration in the pulp liquid phase at the instant of charging the sorbent to the pulp.

If said ore material contains natural sorbents, it is desirable to feed to said reaction zone said porous grained synthetic sorbent containing anion-exchange groups prior to feeding thereto said cyanide.

Charging of the synthetic sorbent to the pulp prior to its being fed with cyanide in processing a starting material containing natural sorbents increases recovery of valuable elements from the ore owing to excluding the absorption of the dissolved gold and silver by these natural sorbents.

BRIEF DESCRIPTION OF THE DRAWINGS

Other objects and advantages of the present invention will become more clear from the following specific examples and accompanying drawings wherein.

DETAILED DESCRIPTION OF THE INVENTION

Figure 1:
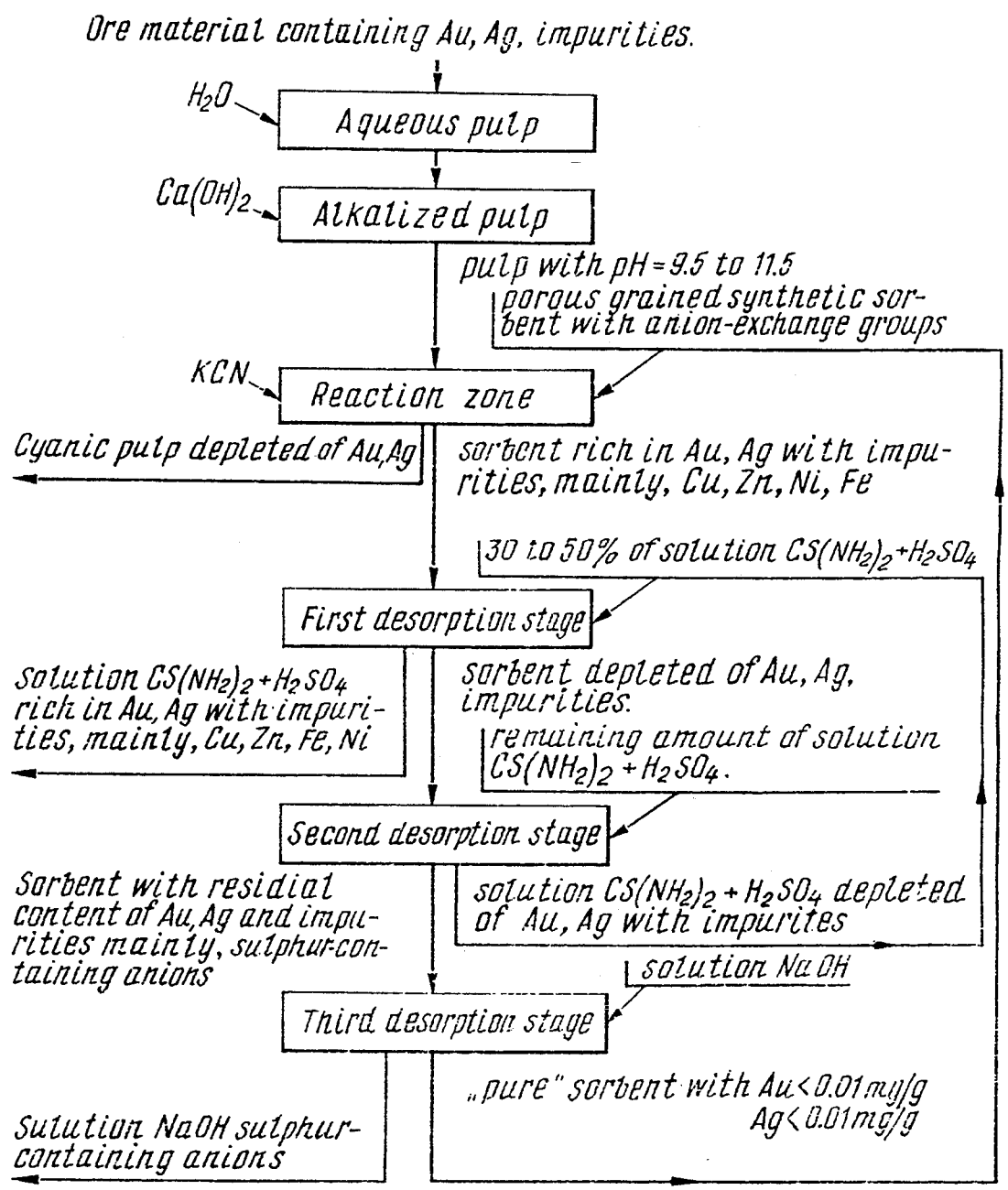
FIG. 1 is a schematic flow sheet of the method for recovering gold and silver from ore materials, according to the present invention.

The method of gold and silver recovery from an ore starting material, according to the present invention, will be described in the examples below.

Example 1

The staring ore material, for example, of the following composition: $SiO_2$—66.5%, $Al_2O_3$—12.4%, $TiO_2$—0.06%, $Fe_2O_3$—2.9%, FeO—1.9%, MnO—0.1%, CaO—1.7%, S—1,7%, C—2%, Cu—0.001%, Zn—0.05%, Ni—0.01%, Au—3,0 g/t, Ag—10 g/t is subjected to grinding to obtain a comminuted material, wherein 92 to 94% of particles have a size less than 0.1 mm. The produced comminuted material is mixed with water with the ratio of the solid phase to the liquid phase S:L=1:1 and a water pulp is produced, the solid phase of which is the comminuted material and the liquid phase is water. Alkali, such as calcium hydroxide $Ca(OH)_2$, is added to the aqueous pulp, and an alkalized pulp is produced with pH=10.5 to 11.0, the solid phase of which is the comminuted ore material and the liquid phase is the aqueous solution of calcium hydroxide. Then, the alkalized pulp is delivered to a reaction zone charged with a porous grained synthetic sorbent containing anion-exchange groups, such as amino-containing resin, and a cyanide, such as potassium cyanide KCN, is fed thereto. In the reaction zone, a cyanic pulp is obtained due to dissolution of potassium cyanide in the aqueous solution of calcium hydroxide, the solid phase of the pulp being the comminuted ore material and the liquid phase being the cyanic solution containing $OH^-$ and $CN^-$ ions.

Potassium cyanide is fed in an amount ensuring the concentration of $CN^-$ ions in the liquid phase of the cyanide pulp from about 0.1 to about 10 g/l, for example, 0.1 to 0.15 g/l. The above-mentioned sorbent is fed in an amount ensuring its concentration 1 to 1.5% of the reaction zone volume, for example, 1%.

Leaching of gold, silver and impurities from the solid phase of the cyanic pulp occurs in the reaction zone, which is accompanied by the formation of negatively charges cyanic complexes of gold, silver and impurities which pass to the liquid phase of the cyanic pulp and are absorbed by the sorbent, and, as a result, a gold- and silver-saturated sorbent with impurities is produced, which contains Au—10 mg/g, Ag—14 mg/g and impurities, mainly Cu—7.2 mg/g, Zn—0.8 mg/g, Fe—3.1 mg/g, Ni—0.5 mg/g and a cyanic pulp depleted of gold and silver and containing Au—0.2 g/t and Ag—1 g/t.

During the leaching, the concentration of $CN^-$ ions in the liquid phase of the cyanic pulp is maintained constant within the above-mentioned limits since in the leaching process the $CN^-$ ions form complexes with Au, Ag and impurities with the result that the concentration of free $CN^-$ ions in the pulp liquid phase is reduced. Therefore, in the process of leaching the concentration of $CN^-$ ions in the liquid phase of the pulp is monitored, and, when the concentration decreases to a value less than 0.1 g/l, potassium cyanide is added in an amount ensuring the above concentration of free $CN^-$ ions. The gold- and silver-saturated sorbent with impurities is separated from the cyanic pulp depleted of gold and silver, for example, on a screen. Then, the cyanic pulp depleted of Au and Ag is taken off the process and directed to a specialized storage, and the Au- and Ag-saturated sorbent with impurities is directed to a desorption zone where Au, Ag and impurities are removed from the sorbent. In the desorption zone, a grained layer of gold- and silver-saturated resin with impurities is formed through which to remove Au, Ag and impurities is passed sulfuric acid solution of thiourea containing 50 to 90 g/l thiourea and 15 to 25 g/l sulfuric acid, for example, 80 g/l $CS(NH_2)_2$ and 25 g/l $H_2SO_4$, the volume of said solution amounting to 10 to 15 volumes of the resin layer, say, 10 volumes of the resin layer.

This operation is carried out in two steps. In the first desorption step, a sulfuric acid solution of thiourea in an amount of 30 to 50%, say 30%, of the total amount of said solution is passed through a layer of Au- and Ag-saturated resin with impurities and a sulfuric acid solution of thiourea with impurities is produced rich in gold and silver, containing Au—1000 mg/l, Ag—1200 mg/l and impurities, mainly Cu—300 mg/l, Zn—30 mg/l, Fe—20 mg/l, Ni—8. This solution is taken off the process to remove Au and Ag using any of the common methods, such as precipitation, electrolysis and the like. After the first decorption step the resin layer becomes depleted of Au, Ag and impurities. The second step of desorption comprises passing through the resin layer depleted of Au, Ag and impurities the remaining amount of the sulfuric acid solution of thiourea, say 70%, and a sulfuric acid solution of thiourea depleted of Au and Ag with reduced amount of impurities is produced, which is directed to the first deorption step, which results in an increased concentration of Au and Ag in the sulfuric acid solution of thiourea and causes a reduction of Au and Ag losses and consumption of the sulfuric acid solution of thiourea. After the second desorption step the resin layer has impurities, mainly sulfur-containing anions, and residual content of gold and silver.

The third step comprises removing the residual impurities from the sorbent by passing through the resin layer a solution of sodium hydroxide with a concentration of 15 to 40 g/l, for example 25 g/l. As a result of the chemical reaction of sodium hydroxide with the residual impuritues present on the resin a sodium hydroxide solution is produced with impurities, mainly containing sulfur-containing anions which is taken off the process, and the purified sorbent containing Au—less than 0.01 mg/g, Ag—less than 0.01 mg/g and impurities, mainly Zn—0.01 mg/g, Cu—0.01 mg/g Cu, Fe—0.02 mg/g, Ni—0.01 mg/g. The purified sorbent is removed from the desorption zone and delivered to the reaction zone.

As a result of implementing the method of the present invention the recovery from the ore material comprises Au—93.3% and Ag—90%.

Example 2

Figure 2:
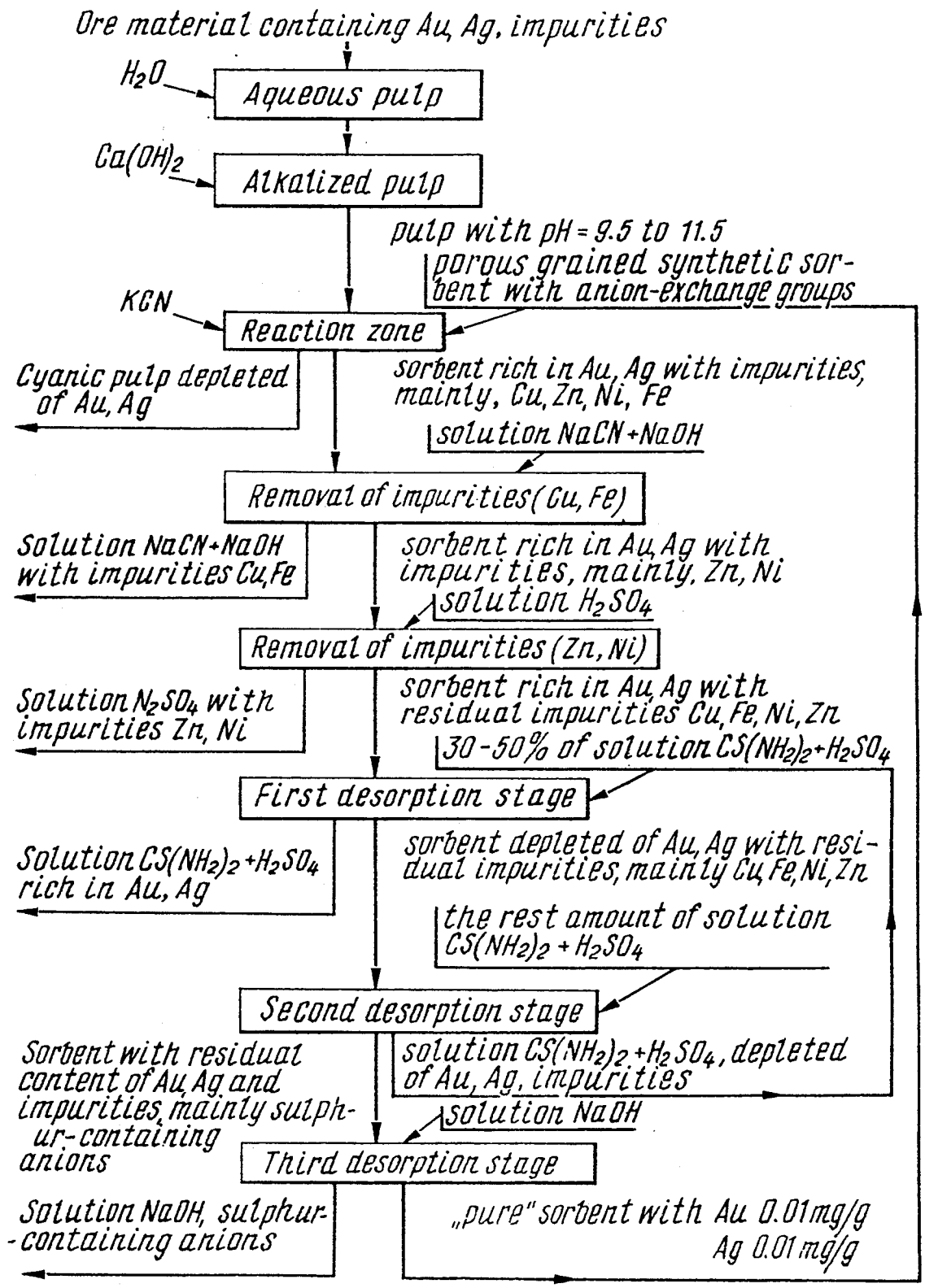
FIG. 2 is a flow sheet of a first embodiment of the method for recovering gold and silver from ore materials according to the invention.

In order to reduce the content of impurities, mainly Cu, Fe, Zn, Ni, in the sulfuric acid solution of thiourea, taken off the process after the first desorption step, there is claimed another embodiment of the method, according to the present invention, shown in FIG. 2.

A starting ore material of the following composition, for example: $SiO_2$—66.5%, $Al_2O_3$—12.4%, $TiO_2$—0.06%, $Fe_2O_3$—2.9%, FeO—1.5%, MnO—0.1%, CaO—1.7%, S—1.7%, C—2%, Cu—0.01%, Zn—0.05%, Ni—0.01%, Au—3.0 g/t. Fg—10.0 g/t is subjected to the operations of producing an aqueous pulp, an alkalized pulp, a cyanic pulp, leaching Ag, Au and impurities and absorbing thereof by a resin, which operations are similar to those set forth in Example 1. The difference resides in that in the desorption zone, an alkaline-cyanic solution containing cyanide—40 g/l and alkali 1 to 2 g/l say, NaCN—40 g/l and NaOH—1.5 g/l, is passed through a layer of gold- and silver-saturated resin with impurities, mainly, Cu, Fe, Zn, Ni, with the result that the cyanic complexes of copper and iron pass to the alkaline-cyanic solution which is taken off the process.

The concentration of copper and iron in the solution comprises Cu—150 mg/l and Fe—30 mg/l. A solution of sulfuric acid with a concentration of 40 to 50 g/l, say, 50 g/l, is passed through the layer of gold- and silver-saturated resin depleted of Cu and Fe and containing impurities, mainly, Zn and Ni. As a result of the chemical reaction of the sulfuric acid with the cyanic complexes of Zn and Ni, the latters pass to the sulfuric acid solution which is taken off the process. The concentration in this solution of Zn is 15 mg/l and of Ni is 3.0 mg/l. Then, a sulfuric acid solution of thiourea similar to that described above is passed through the layer of gold- and silver saturated resin with residual impurities, mainly, Cu, Zn, Fe, Ni, the content of which amounts to 0.2 mg/g, 0.1 mg/g, 0.8 mg/g, 0.1 mg/g respectively and after the first step of desorption a sulfuric acid solution of thiourea is produced, containing Au—1000 mg/l, Ag—1200 mg/l and impurities, mainly Cu—10 mg/l, Zn—0.5 mg/l, Fe—0.3 mg/l, Ni—0.2 mg/l.

After the second desorption step, the resin layer is subjected to treatment with a solution of sodium hydroxide in the same way as in Example 1. As a result of desorption, the resin contains Au—less than 0.01 mg/g Ag—less than 0.01 mg/g and impurities, mainly Cu—less than 0.01 mg/g, Zn—less than 0.01 mg/g Fe—0.05 mg/g Fe, Ni—less than 0.1 mg/g.

The purified resin is removed from the desorption zone and recycled to the reaction zone as described in Example 1.

Example 3

Figure 3:
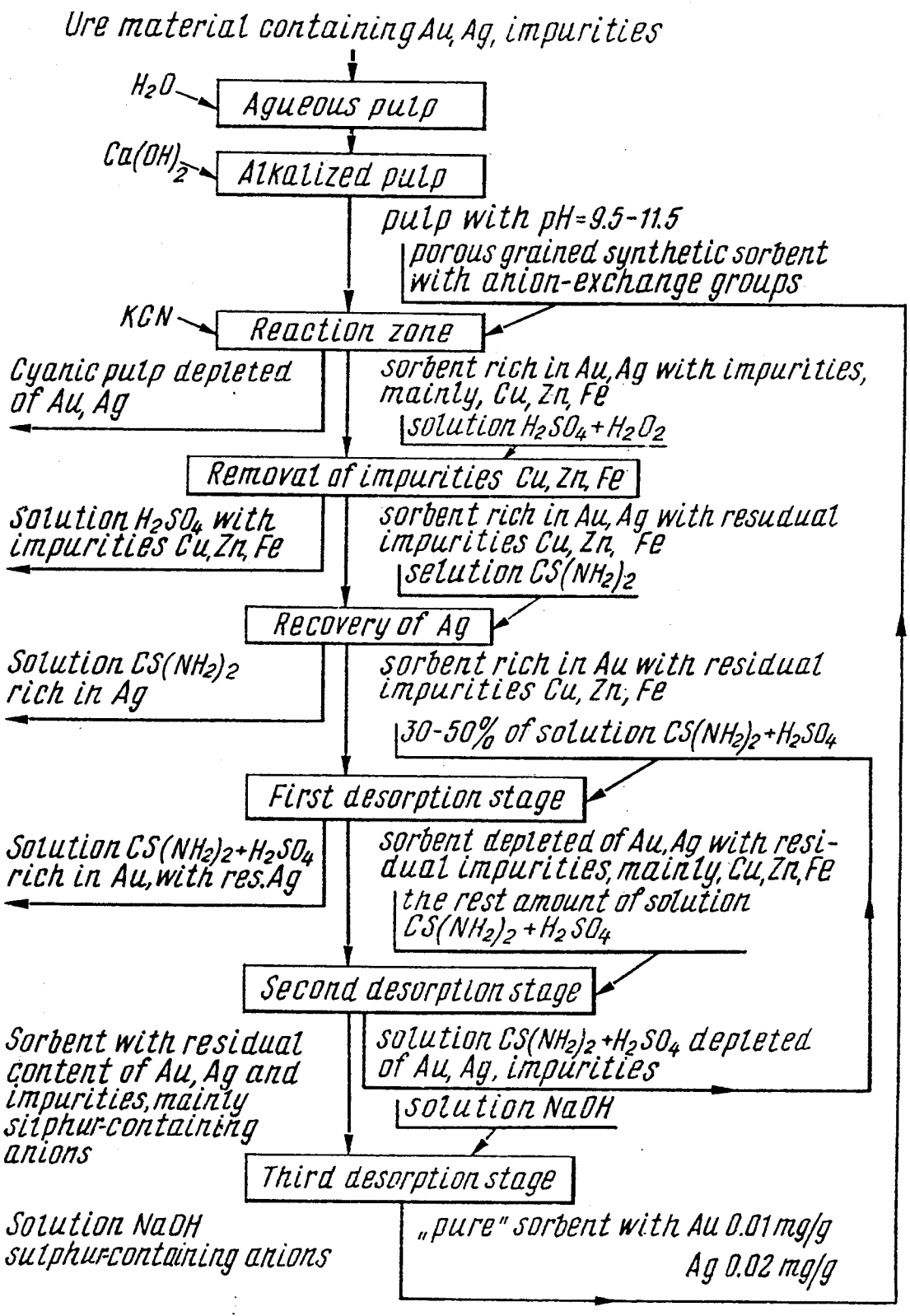
FIG. 3 is a flow sheet of a second embodiment of the method for recovering gold and silver from ore materials according to the present invention.

With a considerable amount of silver in an ore material, such as the ore of the following composition: $SiO_2$—42.5%, $Al_2O_3$—8.6% $Fe_2O_3$—6.7% FeO—3.0%, S—15.6%, C—4.2% Cu—0.02% Zn—0.07%, Au—15.5 g/t, Ag—240 g/t, there is claimed an embodiment of the method for the recovery of gold and silver, according to the present invention, presented in FIG. 3.

This embodiment is similar to that described in Example 1. The differences consist in that, in preparing an aqueous pulp, the ratio of the solid phase to the liquid phase S:L=1:2, that the concentration of ions $CN^-$ in the solution in leaching amounts to 4 to 5 g/l, and that a resin layer with an increased content of Ag is found in the desorption zone and includes Au—12 mg/g Ag—20 mg/g, Cu—15 mg/g, Zn—3.5 mg/g Fe—3.5 mg/g, and a solution of sulfuric acid with hydrogen peroxide is passed through the resin layer. The concentration of this solution is 40 to 50 $H_2SO_4$ and 2 to 8 g/l $H_2O_2$, say, 50 g/l $H_2SO_4$ and 8 g/l $H_2O_2$.

As a result of a chemical reaction of the sulfuric acid with the cyanic complexes of zinc, iron and copper found on the resin in the presence of hydrogen peroxide, Zn, Fe and Cu pass to the sulfuric acid solution with the concentration of Zn—100 mg/l, of Fe—60 mg/l, and Cu—400 mg/l, which solution is taken off the process. A solution of thiourea, with the concentrating $CS(NH_2)_2$—60 to 90 g/l, say 90 g/l, is passed through the layer of Au- and Ag-saturated resin with residual impurities, mainly, Zn, Fe, Cu, the amount of which comprises Zn—0,3 mg/g, Cu—0.5 mg/g, Fe—0.5 mg/g. As a result of this operation, silver passes to the solution of thiourea, which is taken off the process and directed for obtaining metalli silver using any conventional method. The silver concentration in the solution of thiourea being taken off the process comprises 1800 mg/l. Then, as with the embodiments of Example 1, a sulfuric acid solution of thiourea is passed through a layer of Au-saturated resin depleted of Ag with residual impurities, mainly, Zn, Fe, Cu, and, after the first desorption step a sulfuric acid solution thiourea is obtained, which contains Au—800 mg/l, Ag—6 mg/l and residual impurities, mainly, Zn—15 mg/l Cu—8 mg/l Fe—5 mg/l.

After the second desorption step, resin is treated by a solution of sodium hydroxide as is described in Example 1. As a result of the desorption the resin contains Au—0.01 mg/g, Ag—0.02 mg/g and residual impurities, mainly Cu—0.2 mg/g Zn—0.1 mg/g Fe—0.1 mg/g.

The purified resin is removed from the desorption zone and recycled to the reaction zone as in Example 1.

As a result of implementing the method of the present invention, recovery of gold and silver from an ore material is 90% and 95%, respectively.

Example 4

Figure 4:
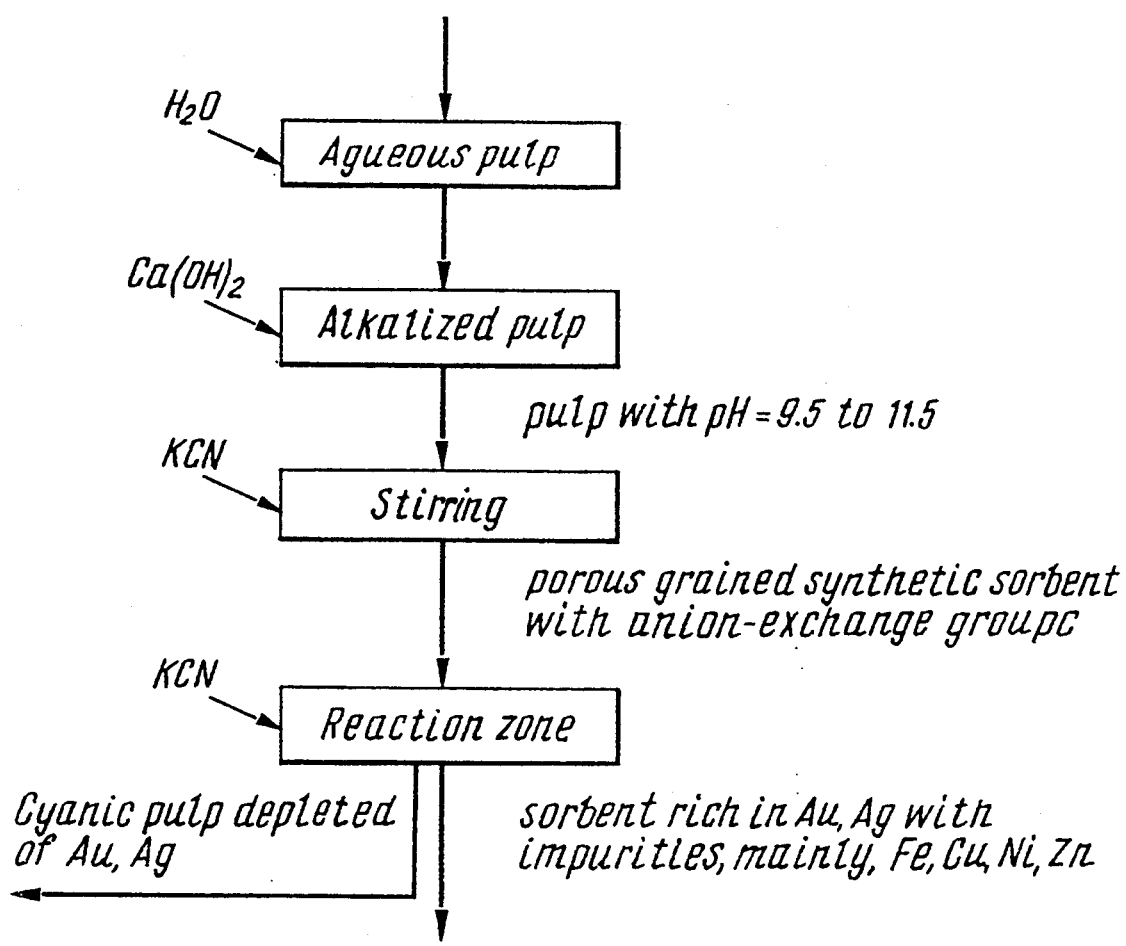
FIG. 4 is a flow sheet of a third embodiment of the method for recovering gold and silver from ore materials, according to the present invention.

There is claimed one more embodiment of the method for the recovery of Au and Ag from an ore material presented in FIG. 4, wherein the operations of sorption of Au and Ag by resin proceed under improved conditions.

The embodiment of the method for Au and Ag recovery disclosed below is preferably used for an ore material which has no natural sorbents, such as carbons, in its composition. An example of such an ore material can be quartz gold- and silver-bearing ore containing Au—1.2 g/t, Ag—25 g/t.

The quartz gold- and silver-bearing ore is treated to produce an aqueous pulp with S:L=1:1 and an alkalized pulp similar to that of Example 1.

The difference is that cyanide, such as KCN, is added to the alkalized pulp and both are stirred. As a result the process of leaching Au, Ag and impurities is started from the pulp solid phase accompanied by passing the cyanic complexes of gold, salver and impurities to the liquid phase of the pulp. The time of stirring is 25 to 50%, say three hours, of the time of leaching Au, Ag from the solid phase of the cyanic pulp, which proceeds in the reaction zone, say, for 12 hours.

The amount of Au and Ag in said liquid phase is 0.45 mg/l and 4.3 mg/l, respectively. The concentration of CN ions in the liquid phase of the cyanic pulp is maintained constant in the range as given in Example 1.

Then, the reaction zone is charged with said stirred cyanic pulp, cyanide KCN and resin which is a porous synthetic artificial sorbent.

As a result of the operations of leaching and absorbing Au, AG and impurities, mainly, Fe, Cu, Ni, Zn, by the resin, set forth in Example 1, a gold- and silver-saturated sorbent is obtained with impurities, in which the content of Au is 5.8 mg/g and Ag is 18.2 mg/g.

Operations in the description zone proceed in the manner described in Example 1, or Example 2, or Example 3.

If the above-described method of Au and Ag recovery for a quartz gold-and silver-bearing ore is conducted without pre-mixing the alkalized pulp with KCN, the gold- and silver-saturated sorbent will contain Au—4.8 mg/g and Ag—15.6 mg/g. Hence, the pre-mixing of the alkalized pulp with KCN increases the content of Au and Ag by 15 to 20% in the saturated sorbent.

Example 5

Figure 5:
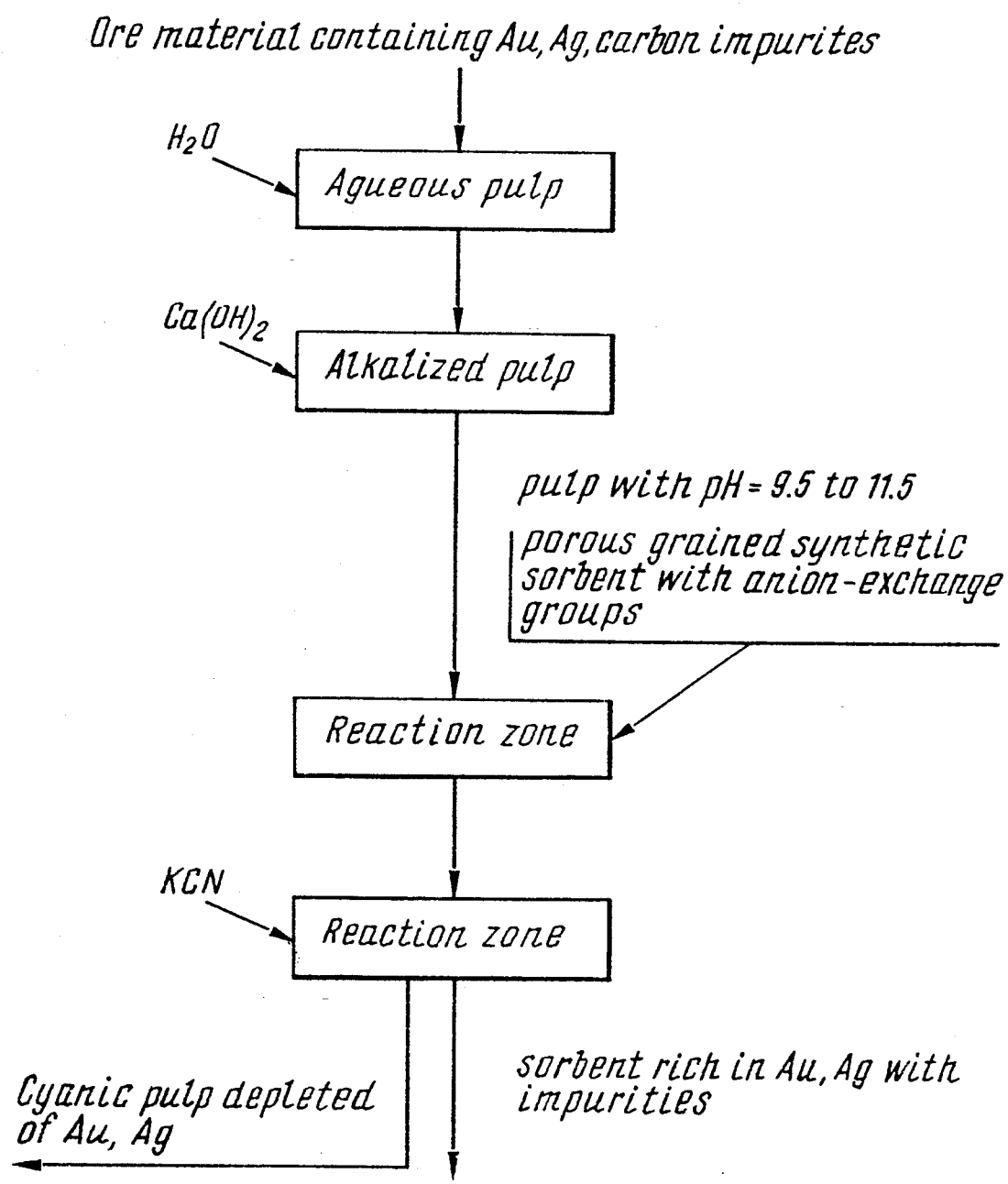
FIG. 5 is a flow sheet of a fourth embodiment of the method for recovering gold and silver from ore materials, according to the invention.

When recovering gold and silver from an ore material containing components which are natural sorbents, such as carbon, bitumen and the like, it is required to carry out the method as shown in FIG. 5.

From the above starting material, that is, carbon-bearing starting ore material of the following composition Au—4.3 g/t, Ag—67 g/t,C (carbon)—1.5% an aqueous pulp is prepared and is leached as described in Example 1.

Then, the reaction zone is charged with an alkalized pulp, resin in the form of a porous grained synthetic sorbent, and then with cyanide, KCN; the cyanic pulp formed in the reaction zone has the concentration of $CN^-$ ions 0.4 to 0.5 g/l. Then, the leaching operation is conducted in a way similar to that described in Example 1. As a result an Au- and Ag-saturated sorbent with impurities is produced and also a cyanic pulp depleted of gold and silver, the solid phase of the pulp containing Au—1.0 g/t, Ag—15 g/t. The resin desorption is carried out according to any of the methods described in Examples 1 to 3. The purified resin is removed from the desorption zone and returned to the reaction zone as in Example 1.

In implementing the above-described method of recovery Au and Ag from a carbon-bearing ore material, according to the invention, recovery of noble metals is Au—76.7%, Ag—77.6%.

We claim:

1. A method for recovering gold and silver from an ore starting material containing gold, silver and impurities, comprising the following steps:

preparing an aqueous pulp whose solid phase is comminuted ore material and whose liquid phase is water;

adding alkali to said aqueous pulp to create in said liquid phase an alkaline medium with pH in a range of from about 9.5 to about 11.5 to provide an alkalized pulp whose solid phase is said comminuted ore material and whose liquid phase is an aqueous alkaline solution;

feeding into a reaction zone of said alkalized pulp, a cyanide soluble in said liquid of said alkalized pulp to form a cyanic pulp whose solid phase is said comminuted ore material and whose liquid phase is an alkaline-cyanic solution containing $OH^-$ and $CN^-$ ions, and a porous grained synthetic sorbent containing anion exchange groups, said cyanide being fed in an amount ensuring the concentration of $CN^-$ ions in said liquid phase of said cyanic pulp of from about 0.1 to about 10 g/l, which concentration being maintained constant, said sorbent being fed in an amount ensuring its concentration 1 to 1.5% of the volume of the reaction zone; gold, silver and impurities being leached in said reaction zone from said solid phase of said cyanic pulp accompanied by the formation of negatively charged cyanic complexes of gold, silver and impurities which pass to the liquid phase of said pulp and are absorbed by said sorbent to obtain as a result a gold- and silver-saturated sorbent with impurities and a cyanic pulp depleted of gold and silver;

separating the gold- and silver-saturated sorbent with impurities from said cyanic pulp depleted of gold and silver, which pulp is taken off the process;

feeding said gold- and silver-saturated sorbent to a desorption zone;

treating in two stages the gold- and silver-saturated sorbent with impurities in the desorption zone by passing therethrough a sulfuric acid solution of thiourea containing 50 to 90 g/l thiourea and 15 to 25 g/l sulfuric acid, the volume of said solution being 10 to 15 volumes of said sorbent for desorbing gold, silver and impurities; at the first stage of said treatment, said sulfuric acid solution of thiourea in an amount of 30 to 50% of said volume of said solution being fed to said gold- and silver-saturated sorbent with impurities to obtain a sulfuric acid solution of thiourea rich in gold and silver, which is taken off the process, and a sorbent depleted of gold, silver and impurities; at the second stage of said treatment, the remaining amount of said sulfuric acid solution of thiourea being fed to said sorbent depleted of gold, silver and impurities to obtain a sulfuric acid solution of thiourea depleted of gold and silver, which is directed to the first stage of said treatment, and a sorbent with a residual content of gold, silver and impurities;

treating in the desorption zone said sorbent with the residual content of gold, silver and impurities with sodium hydroxide solution whose concentration is 15 to 40 g/l to obtain, as a result of a reaction of sodium hydroxide with impurities, a sodium hydroxide solution with impurities, which is taken off the process, and a purified sorbent which is removed from the desorption zone and fed to said reaction zone.

2. A method according to claim 1, comprising the following steps:

feeding into the desorption zone an alkaline cyanic solution containing 40 g/l sodium cyanide and 1 to 2 g/l alkali onto the gold-and silver-saturated sorbent with impurities to obtain a gold-and silver-saturated sorbent depleted of impurities, comprising copper and iron, and a solution with cyanic complexes of impurities, comprising copper and iron, which is taken off the process;

supplying to the desorption zone a sulfuric acid solution whose concentration is 40 to 50 g/l onto the gold- and silver-saturated sorbent depleted of impurities, comprising copper and iron, to obtain as a result a gold-and silver-saturated sorbent with a residual content of impurities and a solution containing impurities, comprising zinc and nickel, which is taken off the process;

said steps of feeding the alkaline cyanic solution and said sulfuric acid solution being carried out prior to treating in two stages the gold- and silver-saturated sorbent with impurities with the sulfuric acid solution of thiourea.

3. A method according to claim 1, comprising the following steps:

feeding a sulfuric acid solution with hydrogen peroxide, containing 40 to 50 g/l sulfuric acid and 2 to 8 g/l hydrogen peroxide, to the desorption zone onto the gold- and silver-saturated sorbent with impurities to obtain as a result a gold- and silver-saturated sorbent depleted of impurities and a solution containing impurities, which is taken off the process;

feeding to the desorption zone a solution of thiourea whose concentration is 60 to 90 g/l onto said gold- and silver-saturated sorbent depleted of impurities to obtain as a result a gold-saturated sorbent depleted of silver with a residual content of impurities and a solution containing silver, which is taken off the process;

said steps of feeding the sulfuric acid solution with hydrogen perioxide and the solution of thiourea being carried out prior to treating in two stages the gold-and silver-saturated sorbent containing impurities with a sulfuric acid solution of thiourea.

4. A method according to claim 1, wherein, prior to feeding said sorbent into said reaction zone, said cyanic pulp, is stirred in said reaction zone for a time being 25 to 50% of the time of leaching gold, silver and impurities from said solid phase of said cyanic pulp.

5. A method according to claim 2, wherein, prior to feeding said sorbent to said reaction zone, said cyanic pulp is stirred in said reaction zone for a time being 25 to 50% of the time of leaching gold, silver and impurities from said solid phase of said cyanic pulp.

6. A method according to claim 3, wherein, prior to feeding said sorbent into said reaction zone, said cyanic pulp is stirred in said reaction zone for a time being 25 to 50% of the time of leaching gold, silver and impurities from said solid phase of said cyanic pulp.

7. A method according to claim 1, wherein, when natural sorbents are present in said ore starting material, said porous grained synthetic sorbent containing anion-exchange groups is supplied to said reaction zone prior to feeding thereto said cyanide.

8. A method according to claim 2, wherein, when natural sorbents are present in said ore starting material, said porous grained synthetic, sorbent containing anion-exchange groups is supplied to said reaction zone prior to feeding thereto said cyanide.

9. A method according to claim 3, wherein, when natural sorbents are present in said ore starting material, said porous grained synthetic sorbent containing anion-exchange groups is supplied to said reaction zone prior to feeding thereto said cyanide.

* * * * *